Aug. 4, 1970

B. T. HARDESTY 3,522,674

REEL MOUNT FOR SPINNING RODS

Filed June 20, 1968

INVENTOR.
BENJAMIN T. HARDESTY
BY Hamilton, Cook,
Renner & Kenner
ATTORNEYS

INVENTOR.
BENJAMIN T. HARDESTY
BY Hamilton, Cork,
Renner & Kenner
ATTORNEYS

United States Patent Office 3,522,674
Patented Aug. 4, 1970

3,522,674
REEL MOUNT FOR SPINNING RODS
Benjamin T. Hardesty, Akron, Ohio, assignor, by mesne assignments, to Columbia Products Company, Columbia, S.C., a corporation of South Carolina
Filed June 20, 1968, Ser. No. 738,607
Int. Cl. A01k 87/06
U.S. Cl. 43—22                        7 Claims

ABSTRACT OF THE DISCLOSURE

A reel mount for the handle on a fishing rod of the spinning type. An axially oriented reel seat in the handle of the spinning rod terminates in opposed slideways, one at each end of the reel seat, that are undercut into the slender handle. A first hood means is slidably received in one of said slideways and is selectively positionable therein, axially of the handle, by a lock means. An opposed, second hood means is slidably received in the other of said slideways. A spring means biases the second hood means toward said first hood means to clamp the mounting foot of a spinning reel therebetween and against the reel seat.

BACKGROUND OF THE INVENTION

The present invention is directed to a reel mount especially adapted to a spinning type fishing rod. Spinning, or spin casting, rods are primarily of one-, two-, or three-piece construction that may be primarily distinguished by a comparatively long, slender handle and the use of graduated line guides.

Manufacturers generally provide spinning type rods with one of three constructions for fastening the reel to the handle: a pair of sliding rings, a fixed reel mount or a sliding reel mount.

Spinning reels are adapted to be detachably mounted on the underside of the spinning rod by a mounting foot that is separated from the housing of the reel by a mounting leg. In use, the fisherman grasps the handle of the rod with the fingers of one hand straddling the mounting leg and positioned between the reel housing and the mounting foot. Thus, the configuration of the means by which the reel is fastened to the rod is of paramount importance to the comfort of the fisherman.

The sliding ring construction for fastening a spinning reel to a rod is considered to be by far the most comfortable of the prior art configurations, but because these rings squeeze the mounting foot directly against the soft cork of the handle itself, the rings have a tendency to work loose, even under normal fishing conditions. Accordingly, this arrangement has never achieved universal popularity. In fact, many fishermen will completely remove the sliding rings and secure the reel in place with tape. While this approach does eliminate the exposed metal corners of the mounting foot and the edges of the slide rings and does provide a more secure mounting, it is most inconvenient for anyone who does not intend to let the reel remain mounted on the handle for long periods of time inasmuch as frequent removal of the tape will accelerate deterioration of the cork in the handle.

The prior known fixed reel mounts are generally metallic with a fixed hood to receive one end of the mounting foot and a sliding hood to receive the other end. The sliding hood is secured in the desired position by a lock nut that is threadably mounted on the handle in such a way that it can be screwed into jamming contact with the sliding hood. This type reel mount does provide the maximum assurance that the reel will remain secured to the rod handle, but the locking nut—which is generally knurled to facilitate tightening and loosening—and the threads on which it turns greatly sacrifice comfort and will cause the hand to blister and cramp during periods of extensive use.

The sliding reel mount is something of a compromise between the sliding ring and the fixed reel mount and utilizes a metallic sleeve over a portion of the cork handle. Sliding rings secure the mounting foot against the sleeve. This construction, too, presents uncomfortable metal corners and edges and is plagued with the inherent tendency of the sleeve to slip on the cork handle.

While reel mounts of the type utilizing a spring-actuated clamping means, as are commonly used on bait casting rods, would eliminate the harsh metallic corners, ring edges, exposed threads and knurlings of prior known mounts for spinning rods that are so uncomfortable to the hand, spring-actuated clamping means have not been adaptable to spinning rods for two considerations that have heretofore been considered mutually exclusive.

One consideration is that the handle of a spinning rod must be slender, and preferably straight, so that the fisherman's hand can not only grasp it with facility but also be positioned such that the index finger can readily hook the line to prepare the reel for the cast and snub the line near the end of the cast. The second consideration is that the length of the mounting foot is not standardized—each reel manufacturer individually selecting a dimension for the length of the mounting foot.

To accommodate spinning reels originating with various manufacturers, the spring clamping means would therefore be required to secure a reel to the rod irrespective of the length of the mounting foot. For one spring to accommodate the variations in the length of the mounting feet now on the market, the diameter of the handle would have to be radically increased because the cross section of the slender handle of the spinning rod would not be sufficient if further reduced to receive such a spring. Nor could the spring size be effectively reduced since clamping means must retain the reel having a short mounting foot as firmly as the reel having a longer mounting foot. Otherwise, a reel having a shorter mounting foot would tend to disengage every time the fisherman either purposely or accidentally lets the rod slip through his fingers until the butt made contact with the dock, boat or other surface upon which the fisherman is standing—as generally occurs when baiting the hook or changing lures. This undesirable result is occasioned because the reel tends to continue its downward motion even after the rod has been stopped. That is, the inertia of the reel acts contra the biasing force of the spring-loaded clamping means, thus disengaging the mounting foot and permitting the reel to become released from the rod handle.

SUMMARY OF THE INVENTION

It is, therefore, a primary object of the present invention to provide an improved reel mount for spinning rods that employs a spring-biased clamping means.

It is another object of the present invention to provide a reel mount, as above, which will accommodate spinning reels irrespective of the length of their mounting feet.

It is still another object of the present invention to provide a reel mount, as above, that will not accidentally release a reel having a relatively short mounting foot any more readily than a reel having a relatively long mounting foot.

It is a further object of the present invention to provide a reel mount, as above, that can be incorporated in the handle of a spinning rod without unduly increasing the desired slender configuration thereof and, at the same time, without decreasing the structural cross section thereof.

It is a still further object of the present invention to provide a reel mount, as above, that is relatively uncomplicated to manufacture and easy to maintain and operate.

These and other objects of the invention, as well as the advantages thereof over existing and prior art forms, will be apparent in view of the following detailed description of the attached drawings and are accomplished by means hereinafter described and claimed.

In general, a reel mount embodying the concept of the present invention utilizes opposed hood means, both of which are movable, to embrace the toe and heel of the mounting foot on a spinning reel. The two hood means are slidably received in ways located at opposite ends of a reel seat in the rod handle, and the ways are undercut into the handle so as not to disturb the smooth gripping surface of the handle.

A lock means is removably received in the handle to fix the first of the hood means at selective positions axially of the handle and within its respective slideway. A spring means biases the second of said hood means toward the first hood means.

One preferred embodiment of the present invention is shown by way of example in the accompanying drawings and described in detail without attempting to show all of the various forms and modifications in which the invention might be embodied.

DETAILED DESCRIPTION OF A PREFERRED EMBODIMENT

Figure 2:
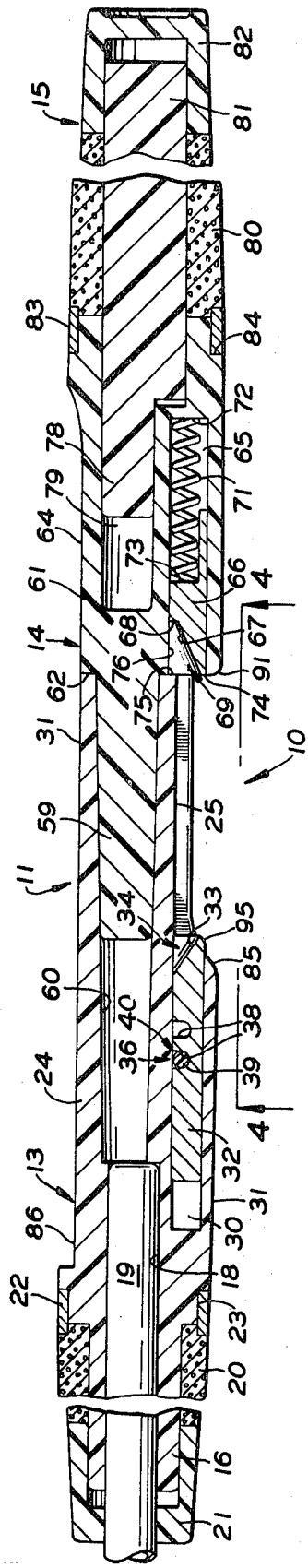
FIG. 2 is an enlarged longitudinal section of the handle, depicted in FIG. 1.
Figure 1:
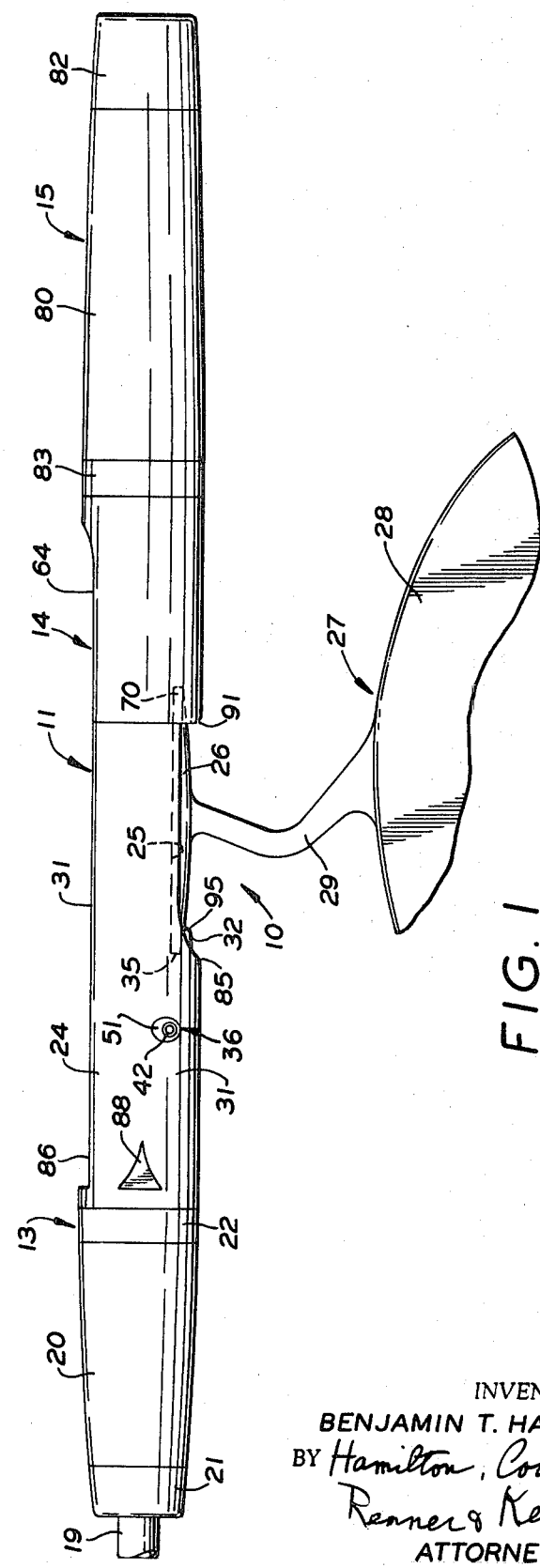
FIG. 1 is a side elevation of the handle portion of a spinning rod depicting a portion of a reel mounted thereon.

Referring more particularly to the drawings, the improved reel mount, indicated generally by the numeral 10, is incorporated in the handle 11 of a spinning rod. The handle 11, for ease of manufacture and assembly, is preferably comprised of a forward section 13, an intermediate section 14 and a rearward section 15.

The forward section 13 has a blade receiving portion 16 of reduced diameter. An axial bore 18 within portion 16 receives the rod blade 19. A frictional engagement between the rod blade 19 and the bore 18 has been found to be satisfactory for retention of the blade 19 within the handle 11, though other means may be utilized, as desired.

A hollow, tapered, front cork 20 is received over the blade receiving portion 16 of the forward section 13. A front cap 21 provides a decorative transition between one end of the cork 20 and the rod blade 19. At the opposite end of the cork 20 a fixed ring 22 embraces the cork 20 and a stepped shoulder 23 at the juncture of the rod receiving portion 16 and the rear, or gripping, portion 24 of the forward section 13 to provide a smooth transition between the cork 20 and the gripping portion 24.

On the underside of the gripping portion 24 is a recessed reel seat 25 adapted to be engaged by the mounting foot 26 of the spinning reel 27. As is typical of spinning reels, the mounting foot 26 is spaced from the housing 28 by a mounting leg 29. The seat 25 extends forwardly into a slideway 30 undercut into the gripping portion 24 of the forward section 13 so as not to disturb the smooth gripping surface 31 on the forward section 13 of handle 11. Slidably received within the way 30 is a toe hood 32. The toe hood 32 has an engaging surface 33 of generally conical section that is inclined radially outwardly and axially rearwardly with respect to the reel seat 25 to form a pocket 34 adapted to engage the toe 35 of the mounting foot 26.

Figure 3:
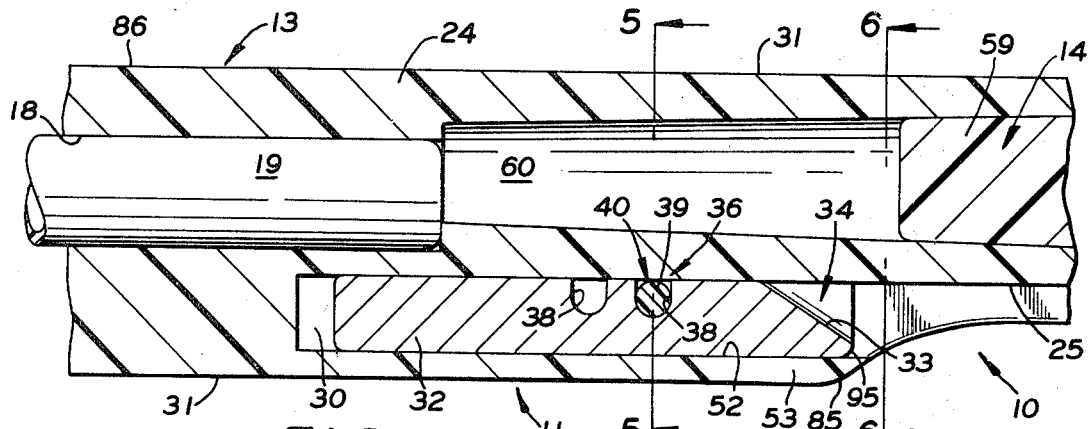
FIG. 3 is a further enlarged area of FIG. 2, also in section.
Figures 5, 7:
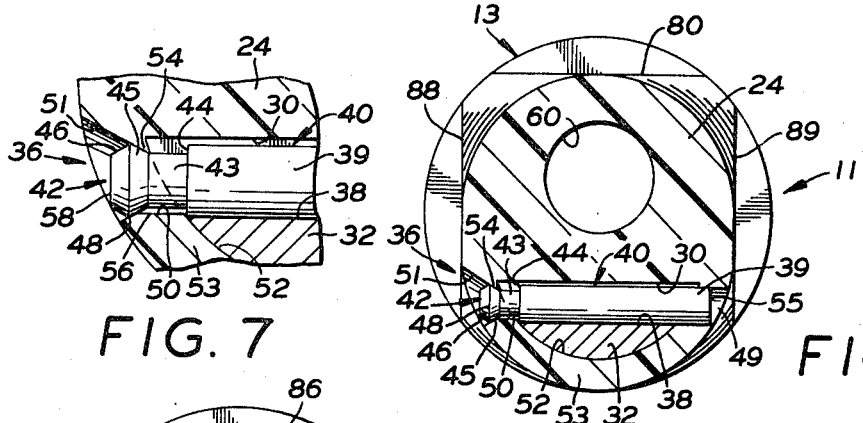
FIG. 5 is a cross section taken substantially on line 5—5 of FIG. 3.
FIG. 7 is an enlarged area of FIG. 5, also in section.

The toe hood 32 is positionable at selective axial locations within the slideway 30 by a lock means 36. As best seen in FIGS. 2 and 3, two, or more, lock notches 38 extend transversely of the toe hood 32 to receive the body portion 39 of a lock pin 40. As best seen in FIGS. 5 and 7, the body portion 39 of lock pin 40 is preferably cylindrical and terminates in a catch head 42 that is spaced longitudinally of the body portion 39 by a neck 43 of reduced diameter.

The juncture of the neck 43 with the body portion 39 presents a stop shoulder 44 that may be oriented radially of the body portion 39, and the opposite end of the neck 43 joins a conically flaring, stop surface 45 on the proximal side of catch head 42. The distal side of head 42 is also preferably provided with a conically-flared entry surface 46 so that the oppositely inclined surfaces 45 and 46 define an annular knife edge 48 on head 42.

An anchor bore 49 oriented transversely of the slideway 30 extends through one side of the gripping portion 24 of the forward section 13 and communicates with the slideway 30 to receive the cylindrical body portion 39 of the lock pin 40. Laterally of the slideway 30 and in register with the anchor bore 49 is a locking aperture 50 that terminates in a conical catch surface 51 that flares laterally outwardly through the side of the gripping portion 24 of the forward section 13.

With the locking aperture 50 positioned radially outwardly with respect to the reel seat 25, the conical catch surface 51 will intersect the locking aperture 50, and the radially inner surface 52 of the arched wall 53 that bounds the radially outer side of the slideway 30, in an apex 54.

The thin apex 54 is at least moderately resilient but can be made of the same material as the entire forward section 13 (or for that matter the remainder of the handle) and yet have sufficient resilience simply by forming that section of a thermoplastic such as polypropylene copolymer, preferably glass filled to control the hardness and tensile modulus.

Thus, when one positions the toe hood 32 at the desired location within the slideway 30, the catch head 42 is inserted through anchor bore 49 and the selected lock notch 38 until the flared entry surface 46 on head 42 is brought into juxtaposition with the locking aperture 50. So positioned, a smart tap on the base 55 of the lock pin 40 will, because of the flexible apex 54, cause the head 42 to be driven through the locking aperture 50. As the knife edge 48 moves past the aperture 50, the neck 43 is embraced thereby. As best seen in FIG. 7, the base 56 of the triangularly-shaped cross section of aperture 50 extends between the head 42 and the stop shoulder 44 to restrain the pin against further movement in the direction of entry. In this position, too, the conical stop surface 45 on the proximal side of head 42 matingly engages the catch surface 51 to restrain the lock pin 40 against overly easy withdrawal.

Pin 40 can, however, be selectively withdrawn by applying a smart tap to the end face 58 of the head portion 42. Here again the flexible apex 54 will yield against the stop surface 45 to permit the head 42 to be returned through the locking aperture 50. Thereafter, one need only grasp the body portion 39 and withdraw the pin 40 to permit selective repositioning of the toe hood 32.

The intermediate section 14 of the handle has a projecting anterior connector 59 (FIG. 2) that may be press fit within a generally axial bore 60 in the gripping portion 24 of the forward section 13. The connector 59 joins the gripping portion 61 of the intermediate section 14 at a radially extending shoulder 62. With projecting connector 59 fully received within bore 60 a smooth juxtaposition of the outer gripping surfaces 31 and 64 on the gripping portions 24 and 61 of adjacent sections 13 and 14, respectively, is achieved.

With the sections 13 and 14 properly joined, the slideway 65 undercut within the gripping portion 61 of the intermediate section 14 beneath surface 64 aligns with the reel seat 25 in opposition to the slideway 30 in the forward section 13. A heel hood 66 is slidably received within the slideway 65. A generally conical engaging surface 67 is inclined radially outwardly and axially forwardly with respect to the reel seat 25 from a radially oriented extension shoulder 68 on the heel hood 66 to form a pocket 69 adapted to engage the heel 70 of the mounting foot 26.

A spring 71 is compressed between the base 72 of the slideway 65 and the rear wall 73 on the heel hood 66 to bias the heel hood forwardly toward the opposed toe hood 32. Engagement of the lateral portions of the forward edge 74 on the heel hood 66 with an offset shoulder 75 presented by the difference in the radial position of the inner surface 76 of the slideway 65 and the reel seat 25 maintains the heel hood 66 within the slideway 65.

The rearward section 15 also has a projecting anterior connector 78 that may be press fit into an axial bore 79 within the gripping portion 61 of the intermediate section 14. A hollow, tapered, rear cork 80 is received over the posterior portion 81 of the rearward section 15. A butt cap 82 provides a decorative and protective rearmost termination of the handle 11 and a fixed ring 83 embraces the cork 80 and a stepped shoulder 84 at the rear of the intermediate section 14 to provide a smooth transition between the cork 80 and gripping portion 61.

To mount a spinning reel on handle 11, the sliding toe hood 32 is fixed in the axial position most suitable for the mounting foot on the reel to be used. The front cork 20 is then grasped in one hand with the butt cap 82 resting firmly against the fisherman's leg or other support. With the other hand holding the reel 27 the heel 70 of the mounting foot 26 is directed into the pocket 69 beneath the heel hood 66 and the reel 27 is moved to press the mounting foot 26 rearwardly of the handle against the heel hood 66 and thereby compress the spring 71. The heel hood 66 is moved against the spring 71 sufficiently that the toe 35 of the mounting foot 26 can be swung radially inwardly past the toe hood 32. So positioned the toe 35 is guided into the pocket 34. As that hand grasping the reel 27 relaxes, the spring 71 forces the heel hood 66 forwardly until the mounting foot 26 is held against the reel seat 25 by the engaging surfaces 33 and 67 on the toe and heel hoods 32 and 66, respectively.

Figure 4:
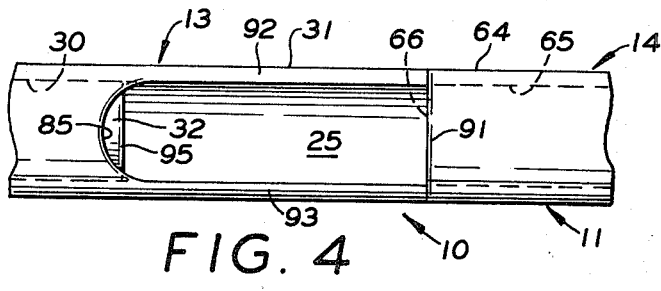
FIG. 4 is a partial bottom plan taken substantially on line 4—4 of FIG. 2.

Should the mounting foot 26 be too loosely entrapped against the reel seat 25, the reel 27 may be removed, by a reversal of the mounting procedure, and the toe hood 32 repositioned further rearwardly. Conversely, should be mounting foot 26 be of such length that it can not swing past the hood 32, the hood 32 should be repositioned further forwardly. To facilitate accommodation of the longer mounting feet and also to provide improved finger gripping access to the toe hood 32, an arcuate relief 85 may be provided in the gripping portion 24 of the forward section 13 (FIG. 4).

The outer configuration of the handle 11 is also completely concomitant with the objective of providing comfort to the fisherman. Specifically, the smooth gripping surface 31 on the forward section 13 merges into a flat 86 on the upper, forward portion thereof. This flat 86 provides an engaging surface for the fisherman's thumb that encourages him to exert forward pressure to the handle therewith during the power stroke. Similar side flats 88 and 89 are provided, although these are primarily decorative.

Figure 6:
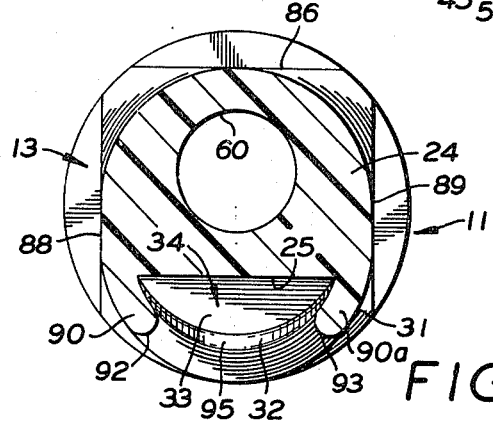
FIG. 6 is a cross section taken substantially on line 6—6 of FIG. 3.

In addition, the lateral walls 90 and 90a of the reel seat 25 are rounded along their exposed edges 92 and 93, respectively, (FIG. 6) as are the arcuate relief 85, that forms the forward boundary of the access to the reel seat, and edge 91, that forms the rearward boundary of the said access. Further, because the fingers grasping the handle 11 straddle the mounting leg 29, the exposed portion of the toe hood 32 is also rounded, as at 95.

As such, a reel mount embodying the concept of the present invention employs a spring-biased clamping means to accommodate spinning reels having mounting feet of various lengths without increasing the desired slender configuration of the spinning rod handle or decreasing the structural cross section thereof and otherwise accomplishes the objects of the invention.

What is claimed is:

1. A reel mount for the handle of a spin fishing rod comprising, a reel seat having opposed ends in said handle, a slideway undercut in said handle at one end of said reel seat, a first hood means received in said slideway, said first hood means being positionable at selected locations axially of said handle, lock means to fix said first hood means at selective locations axially of said handle, a second hood means at the opposite end of said reel seat, said second hood means movable axially with respect to said handle, and spring means biasing said second hood means toward said first hood means.

2. A reel mount, as set forth in claim 1, in which said lock means comprise, at least two lock notches transversely of, and in, said first hood means, an anchor bore in said handle transversely of, and communicating with, said sideway, a locking aperture in said handle oppositely of said slideway and in substantial registry with said anchor bore, a lock pin receivable through said anchor bore and locking aperture in said handle and in selective of the lock notches in said first hood means.

3. A reel mount, as set forth in claim 2, in which said lock pin has a body portion and a catch head, said catch head being spaced longitudinally of said body portion by a neck portion, said catch head and body portion releasably engaging opposite sides of said locking aperture to maintain said lock pin in said handle.

4. A reel mount, as set forth in claim 3, in which the catch head has a larger transverse dimension than said locking aperture but said locking aperture has a resilient apex on at least one side thereof to permit selective insertion and withdrawal of said catch head therethrough.

5. A reel mount, as set forth in claim 4, in which said catch head had a conically flaring stop surface on the side proximal to said body portion and an oppositely inclined conically flaring entry surface on the side distal to said body portion, said locking aperture terminating in a conical catch surface that flares outwardly through the handle laterally of said slideway for mating engagement with the stop surface on said catch head.

6. A reel mount, as set forth in claim 5, in which the second hood means is also received in a slideway undercut in said handle at the opposite end of said reel seat.

7. A reel mount, as set forth in claim 6, in which said first hood means is located forwardly of said reel seat and said second hood means is located rearwardly of said reel seat.

References Cited

UNITED STATES PATENTS

| | | | |
|---|---|---|---|
| 1,987,889 | 2/1933 | Clarke | 43—22 |
| 3,175,323 | 3/1965 | Axelsson | 43—22 |
| 3,233,355 | 2/1966 | Chion | 43—22 |

SAMUEL KOREN, Primary Examiner

D. J. LEACH, Assistant Examiner

UNITED STATES PATENT OFFICE
CERTIFICATE OF CORRECTION

Patent No. 3,522,674        Dated August 4, 1970

Inventor(s) Benjamin T. Hardesty

It is certified that error appears in the above-identified patent and that said Letters Patent are hereby corrected as shown below:

Column 4, line 13, after "40" insert a period. Column 5. line 59, "be", first occurrence, should read -- the --. Claim 2, line 5, "sideway" should read -- slideway --. Column 6, in References Cited, "1,987,889" should read -- 1,897,889 --.

Signed and sealed this 6th day of June 1972.

(SEAL)
Attest:

EDWARD M. FLETCHER, JR.
Attesting Officer

ROBERT GOTTSCHALK
Commissioner of Patents